(12) United States Patent
Lansel et al.

(10) Patent No.: US 10,706,572 B2
(45) Date of Patent: Jul. 7, 2020

(54) SYSTEM AND METHOD FOR DEPTH ESTIMATION USING MULTIPLE ILLUMINATION SOURCES

(71) Applicants: OLYMPUS CORPORATION, Tokyo (JP); THE BOARD OF TRUSTEES OF THE LELAND STANFORD JUNIOR UNIVERSITY, Stanford, CA (US)

(72) Inventors: Steven Paul Lansel, East Palo Alto, CA (US); Brian A. Wandell, Stanford, CA (US); Andy Lai Lin, Santa Clara, CA (US)

(73) Assignees: OLYMPUS CORPORATION, Tokyo (JP); THE BOARD OF TRUSTEES OF THE LELAND STANFORD JUNIOR UNIVERSITY, Stanford, CA (US)

( * ) Notice: Subject to any disclaimer, the term of this patent is extended or adjusted under 35 U.S.C. 154(b) by 291 days.

(21) Appl. No.: 15/754,258

(22) PCT Filed: Aug. 26, 2016

(86) PCT No.: PCT/US2016/049075
§ 371 (c)(1),
(2) Date: Feb. 21, 2018

(87) PCT Pub. No.: WO2017/035498
PCT Pub. Date: Mar. 2, 2017

(65) Prior Publication Data
US 2018/0232899 A1   Aug. 16, 2018

Related U.S. Application Data

(60) Provisional application No. 62/210,085, filed on Aug. 26, 2015.

(51) Int. Cl.
*G06K 9/00* (2006.01)
*G06T 7/586* (2017.01)
(Continued)

(52) U.S. Cl.
CPC ........... *G06T 7/586* (2017.01); *H04N 5/2256* (2013.01); *H04N 5/2351* (2013.01); *G06T 2207/10068* (2013.01); *G06T 2207/10152* (2013.01)

(58) Field of Classification Search
CPC .......... G06T 7/586; G06T 2207/10152; G06T 2207/10068; H04N 5/2351; H04N 5/2256
(Continued)

(56) References Cited

U.S. PATENT DOCUMENTS 4,843,565 A   6/1989   Rose
6,897,946 B2   5/2005   Uomori et al.
(Continued)

OTHER PUBLICATIONS

Miao Liao et al, "Light Fall-off Stereo," Computer Vision and Pattern Recognition, 2007. CVPR '07. IEEE Conference on Jun. 17-22, 2007, XP055318477. (Year: 2007).*
(Continued)

*Primary Examiner* — Van D Huynh
(74) *Attorney, Agent, or Firm* — Holtz, Holtz & Volek PC

(57) ABSTRACT

Systems and methods for performing depth estimation may comprise: an illuminator capable of illuminating a scene from at least a first position and a second position, an image sensor to capture (i) a first image of the scene while the illuminator illuminates the scene from the first position and (ii) a second image of the scene while the illuminator illuminates the scene from the second position, and an image processor to receive the first and second images from the image sensor and estimate a depth of at least one feature that appears in the first and second images. The depth is esti-
(Continued)

mated based on the relative intensity of the first image and the second image, a distance between the first illumination position and the second illumination position, and a position of the at least one feature within at least one of the first and second images.

21 Claims, 11 Drawing Sheets

(51) Int. Cl.
*H04N 5/225* (2006.01)
*H04N 5/235* (2006.01)
(58) Field of Classification Search
USPC ........................................... 382/106
See application file for complete search history.

(56) References Cited

U.S. PATENT DOCUMENTS

| | | | |
|---|---|---|---|
| 9,460,516 B2* | 10/2016 | Wu | H04N 9/27 |
| 2001/0021011 A1* | 9/2001 | Ono | G06T 7/586 |
| | | | 356/3 |
| 2001/0052985 A1* | 12/2001 | Ono | G01S 17/89 |
| | | | 356/614 |
| 2003/0193658 A1* | 10/2003 | Uomori | G01S 17/46 |
| | | | 356/3.1 |
| 2008/0231835 A1 | 9/2008 | Iizuka | |
| 2014/0321712 A1* | 10/2014 | Ciurea | G02B 27/0075 |
| | | | 382/106 |

OTHER PUBLICATIONS

Keigo Iizuka, "Surface Imaging Using a Noncontact Divergence-ratio Axi-vision Camera Profilometer for Laparoscopic and Endoscopic applications," Applied Optics, Optical Society of America, Washington, D.C., vol. 52, No. 19, Jul. 1, 2013, pp. 4663-4671, XP001583365. (Year: 2013).*

International Search Report issued on PCT/US2016/049075 (dated Jan. 16, 2017) pp. 1-5.

Miao Liao et al, "Light Fall-off Stereo," Computer Vision and Pattern Recognition, 2007. CVPR '07. IEEE Conference on Jun. 17-22, 2007, XP055318477.

Keigo Iizuka, "Surface Imaging Using a Noncontact Divergence-ratio Axi-vision Camera Profilometer for Laparoscopic and Endoscopic applications," Applied Optics, Optical Society of America, Washington, D.C., vol. 52, No. 19, Jul. 1, 2013, pp. 4663-4671, XP001583365.

* cited by examiner

SYSTEM AND METHOD FOR DEPTH ESTIMATION USING MULTIPLE ILLUMINATION SOURCES

CROSS-REFERENCE TO RELATED APPLICATIONS

The present application is the national stage of PCT Patent Application No. PCT/US2016/049075, filed Aug. 26, 2016, which claims priority to U.S. Provisional Patent Application No. 62/210,085, filed Aug. 26, 2015, the contents of which are specifically incorporated herein in their entirety by express reference thereto.

FIELD OF THE INVENTION

Embodiments of the present disclosure relate generally to imaging systems for depth estimation.

BACKGROUND

Imaging systems in the field of the invention generally rely on the basic principle of triangulation. The most basic implementation of this principle involves images from only two locations where the effective aperture for the pixels in the two images is small relative to the separation between the two points. (Herein the effective aperture is the portion of the physical aperture that contains all of the rays that reach the active part of the sensing pixel.) This implementation with two images from different locations is called stereo vision and is often implemented with two separate cameras and lenses. To perform triangulation, a correspondence problem for the images from different locations needs to be solved to determine the location of an object in both images. The location within the images determines a direction from the positions of the cameras to the object. The intersection of these two lines determines the object's location in a scene, which gives the depth of the object.

Depth estimates obtained using such techniques are useful for a variety of applications. For example, depth estimates may be used to obtain a three dimensional map of a site or area of interest, such as a construction site, a room, an anatomical region, and/or the like. Depth estimates may also be used to form three dimensional models of objects for applications such as three-dimensional printing or for archival purposes. Depth estimates may also be used by cinematographers, photographers, or other artists to form three-dimensional images or video.

Accordingly, it would be desirable to develop improved imaging systems and methods for estimating the depth of an object.

SUMMARY OF THE INVENTION

A system for performing depth estimation may comprise: an illuminator capable of illuminating a scene from at least a first position and a second position, an image sensor configured to capture a first image of the scene while the illuminator illuminates the scene from the first position and a second image of the scene while the illuminator illuminates the scene from the second position, and an image processor configured to receive the first and second images from the image sensor and estimate a depth of at least one feature that appears in the first and second images. The depth is estimated based on the relative intensity of the first image and the second image, a distance between the first illumination position and the second illumination position, and a position of the at least one feature within at least one of the first and second images.

A method for performing depth estimation may comprise: obtaining a first intensity measurement of a feature while the feature is illuminated from a first position, obtaining a second intensity measurement of the feature while the feature is illuminated from a second position, determining a relative intensity of the feature based on the first and second intensity measurements, determining a distance between the first and second positions, determining a location of the feature relative to an axis of displacement between the first and second positions, and estimating the depth of the feature. The depth is estimated based on the relative intensity, the distance between the first and second positions, and the location of the feature.

A method for generating a depth map may comprise: obtaining a first image and a second image, calculating a depth map based on the first and second images, calculating a normal vector map based on the depth map, and recalculating the depth map based on the first and second images and the normal vector map.

BRIEF DESCRIPTION OF THE DRAWINGS

These and other aspects and features of the present disclosure will become apparent to those ordinarily skilled in the art upon review of the following description of specific embodiments in conjunction with the accompanying figures, wherein:

FIG. 2B illustrates a plot of the percent error in the depth estimates as a function of a;

DETAILED DESCRIPTION

Figure 1:
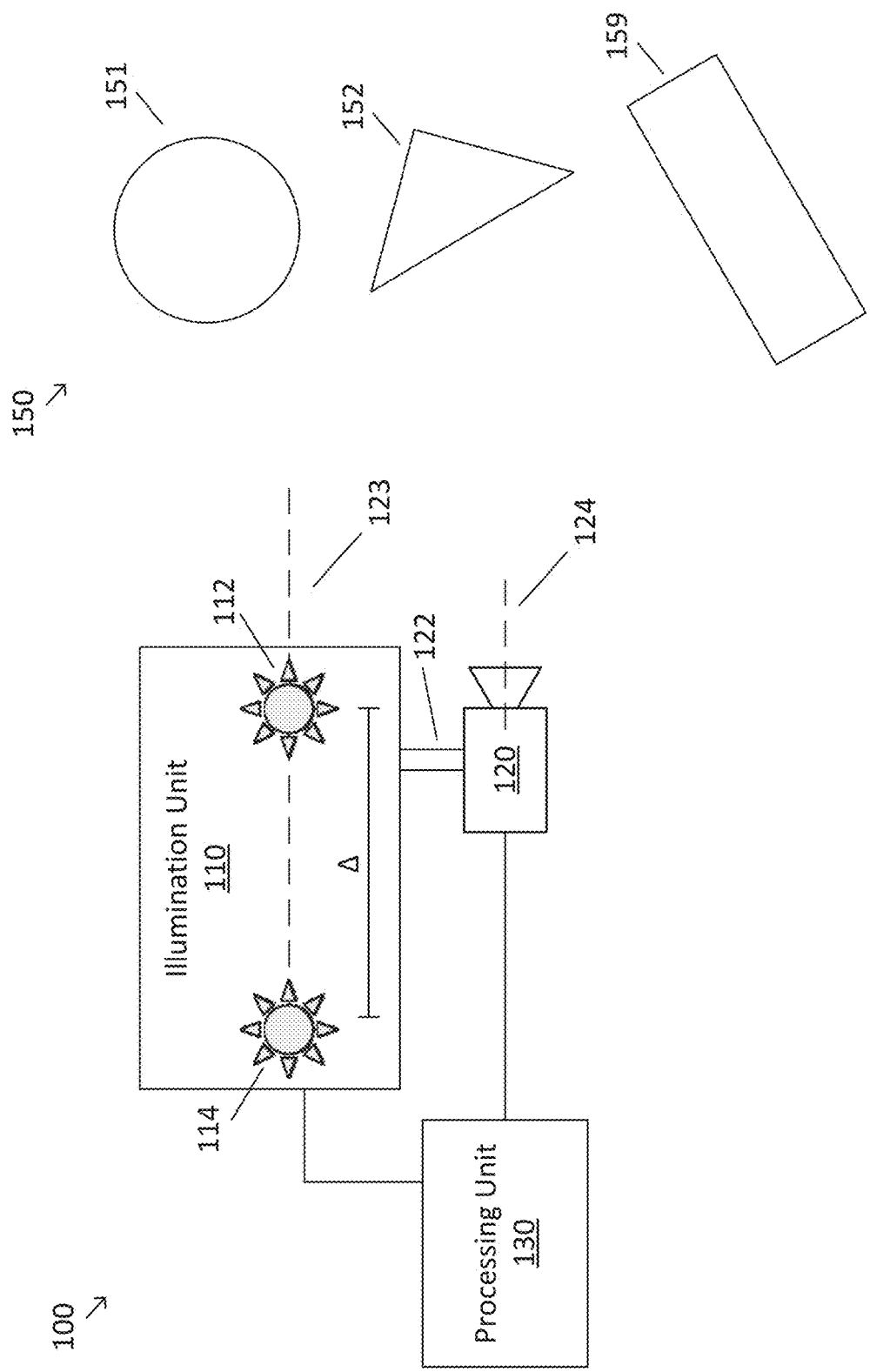
FIG. 1 illustrates an imaging system according to some embodiments.

Embodiments of the present disclosure will now be described in detail with reference to the drawings, which are provided as illustrative examples of the disclosure so as to enable those skilled in the art to practice the disclosure. The drawings provided herein include representations of devices and device process flows which are not drawn to scale. Notably, the figures and examples below are not meant to limit the scope of the present disclosure to a single embodiment, but other embodiments are possible by way of interchange of some or all of the described or illustrated elements. Moreover, where certain elements of the present disclosure can be partially or fully implemented using known components, only those portions of such known components that are necessary for an understanding of the present disclosure will be described, and detailed descriptions of other portions of such known components will be omitted so as not to obscure the disclosure. In the present specification, an embodiment showing a singular component should not be considered limiting; rather, the disclosure is intended to encompass other embodiments including a plurality of the same component, and vice-versa, unless explicitly stated otherwise herein. Moreover, inventors do not intend for any term in the specification or claims to be ascribed an uncommon or special meaning unless explicitly set forth as such. Further, the present disclosure encompasses present and future known equivalents to the known components referred to herein by way of illustration.

The present disclosure describes an imaging system that in some embodiments may estimate the depth of an object. The imaging system may comprise an illuminator capable of illuminating a scene from at least a first position and a second position, an image sensor configured to capture a first image of the scene while the illuminator illuminates the scene from the first position and a second image of the scene while the illuminator illuminates the scene from the second position, and an image processor configured to receive the first and second images from the image sensor and estimate a depth of at least one feature that appears in the first and second images.

There are a variety of ways to acquire depth images and/or depth maps of a scene. Active methods send light from imaging equipment into the scene and measure the response. One active technique is time of flight imaging that measures the amount of time required for light to travel into the scene and return to the imaging system. Another technique is structured light where some type of projector is used to illuminate the scene with light patterns such as sinusoidal or squares waves, random dots, or various other patterns. Through triangulation using the projector and an image captured by an imaging system, the depth is estimated. Both time of flight and structured light require lighting systems with complex components. These components are expensive, prone to breaking or misalignment, and require significant space and additional equipment for mechanical and electrical support.

Passive techniques do not emit any light into the scene, but simply measure the ambient light received from a scene. Such techniques include stereo matching, light field cameras, camera arrays, and depth from defocus. Most of these passive techniques are not robust to estimate depth for regions of the scene without any texture on the surface of objects, which occurs commonly for most scenes. Moreover, some passive depth estimation techniques, including stereo vision and camera arrays, require multiple cameras placed in different positions to infer depth. One disadvantage of using multiple cameras is the increased cost and power requirements. Multiple cameras also require careful position and spectral calibration as well as placement in multiple positions. The monocular cameras utilized in embodiments described herein require less equipment so may be cheaper and more compact than multiple camera systems and also may require little or no calibration.

Some imaging systems can measure depth maps of a scene through multiple exposures including video recording. Techniques include when the camera is moved through different positions or the camera acquires multiple images each with different focal settings. These systems are limited to scenes that are static since any movement within the scene interferes with depth estimation.

Other depth estimation techniques include shape from shading and photometric stereo, which use light coming from known direction(s) and estimate depth by analyzing the intensity of light captured by an image system to determine the relative shape of objects in the scene. Shape from shading generally uses a single image, whereas photometric stereo uses multiple images each captured under illumination from a different direction. These techniques assume the light is approximately collimated without any significant falloff as it passes through the scene. This assumption often requires use of large light sources placed relatively far from the scene. This assumption also results in estimation of only the relative shape of the surface while the absolute distance of points or objects in the scene is not possible. Additionally, shape from shading generally requires a constant or known albedo (overall object brightness), which is not practical for nearly all natural objects. Shape from shading and photometric stereo generally assume objects are Lambertian, which means they reflect light equally in all directions. Again this is not practical for many natural objects. In comparison, the disclosed invention is compatible with light sources that are compact and positioned relatively close to the scene, which allows for small and inexpensive illumination sources to be used. Also the disclosed invention is robust to the albedo or color of surfaces in the scene as well as their angular reflectance functions.

Another depth estimation technique involves capturing two images where the image sensing unit remains stationary and the scene is illuminated from illumination unit or units that are placed at different distances ("near" and "far") from the scene. The distance is estimated as $$\widehat{d_1} = \frac{\Delta}{\sqrt{\frac{m_1}{m_2}} - 1} \quad \text{Eq. 0}$$

where $\widehat{d_1}$ represents the estimated depth of a point of interest from the first position of illumination unit, $\Delta$ represents the distance between the near and far positions of the illumination unit or units, and $m_1$ and $m_2$ represent the measured intensities of the point of interest in the first and second images corresponding to the first and second positions, respectively. This technique generally is able to estimate depth using a compact system that includes a single imaging sensing unit and illumination unit and also can operate reliably on regions of the scene with little or no contrast. However, this technique provides an accurate depth estimate for only a single point of the scene that lies on the line connecting the positions of the illumination units. Significant errors are introduced for points away from this line. The systematic depth error results in estimates being noticeably distorted, except when the observed scene is contained within a small cone emanating from the position of the illumination unit that is centered about the line connecting the positions of the illumination unit. Therefore either the region of the scene with accurate depth estimates is limited in size by such a cone or the illumination units must be placed at a significant distance from the scene in order to increase the size of the cone An example of an imaging system may include an endoscope system. However, some approaches to obtaining depth measurements and/or depth maps—including those discussed above—may be incompatible with existing endoscope hardware. Accordingly, it would be desirable to obtain depth measurements and/or depth maps using an approach that is compatible with existing endoscope hardware. It is further desirable for this approach to be robust and/or scalable (e.g., able to be miniaturized to the requirements of an endoscope).

FIG. 1 illustrates an imaging system 100 according to some embodiments. Imaging system 100 includes an illumination unit 110 and an image sensing unit 120. A processing unit 130 is communicatively coupled to one or more of illumination unit 110 and/or image sensing unit 120.

Illumination unit 110 is configured to illuminate a scene 150 that includes one or more objects 151-159. According to some embodiments, illumination unit 110 may be the only significant source of illumination for scene 150. Such a scenario may be typical, for example, when imaging system 100 is used as an endoscope inside a human body. However, in some embodiments, there may be additional sources of illumination for scene 150. Such a scenario may be typical, for example, when imaging system is used in outdoor photography applications. When illumination unit 110 is not the only significant source of illumination to scene 150, a variety of techniques may be employed to reduce adverse effects associated with the ambient illumination sources. In some examples, the relative contribution of ambient illumination may be reduced. For example, the power (output intensity) of illumination unit 110 may be increased. In some examples, illumination unit 110 and image sensing unit 120 may be synchronized in time so that an image captured by image sensing unit 120 is exposed over approximately the same duration that illumination unit 110 illuminates scene 150. Consistent with such embodiments, illumination unit 110 may be designed to emit light with a high intensity over a short duration of time, such that the relative contribution of the ambient illumination may be significantly reduced.

In some examples, illumination unit 110 may be a source of isotropic illumination (i.e., illumination radiating equally in all directions). However, in some embodiments, isotropic illumination may not be optimally efficient because some of the illumination travels in directions other than towards scene 150, resulting in wasted illumination output. Accordingly, in some examples, illumination unit 110 may be a source of non-isotropic illumination. For example, illumination unit 110 may include one or more light emitting diodes, which typically emit illumination as a varying function of angle.

In some examples, illumination unit 110 may be a source of electromagnetic radiation, which may include visible light, ultraviolet radiation, infrared radiation, and/or any combination thereof. In some examples, the light/radiation output by illumination unit 110 may be polarized, unpolarized, coherent, non-coherent, pulsed, continuous, and/or the like. In some examples, the spectral characteristics of illumination unit 110 are optimized based on the sensitivity of image sensing unit 120, the composition of scene 150, and/or any ambient illumination. For example, illumination unit 110 and image sensing unit 120 may be designed to operate in a similar spectral band (e.g., a portion of infrared light) where the ambient illumination has little or no energy. In some embodiments, the wavelengths output by illumination unit 110 may correspond to wavelengths at which objects in the scene 150 have higher and/or more uniform reflectance properties.

According to some embodiments, illumination unit 110 may include one or more light sources (such as light sources 112 and 114), lenses, apertures, reflectors, and/or the like. According to some embodiments, lenses, apertures, and/or reflectors may be used to change the angular and/or spatial characteristics of the one or more light sources. For example, according to some embodiments, illumination unit 110 may include one or more lenses positioned between one or more light sources and scene 150. Consistent with such embodiments, illumination unit 110 may simultaneously achieve advantageous properties of a distant illumination source within a physically compact form factor. In some examples, a reflector may be wrapped around the one or more light sources in order to direct illumination towards scene 150 that would otherwise travel away from scene 150 and be wasted. Accordingly, illumination unit 110 may include various components that maximize performance, functionality, and/or energy efficiency during operation.

Image sensing unit 120 is configured to capture images of scene 150 while scene 150 is illuminated by illumination unit 110. Image sensing unit 120 generally includes any device suitable for converting electromagnetic signals carrying information associated with scene 150 into electronic signals that retain at least a portion of the information contained in the electromagnetic signal. According to some embodiments, image sensing unit 120 may include a camera and/or video recorder. According to some embodiments, image sensing unit 120 may generate a digital representation of an image contained in the incident electromagnetic signal. The digital representation may include raw image data that is spatially discretized into pixels. For example, the raw image data may be formatted as a RAW image file. According to some examples, image sensing unit 120 may include a charge coupled device (CCD) sensor, active pixel sensor, complementary metal oxide semiconductor (CMOS) sensor, N-type metal oxide semiconductor (NMOS) sensor and/or the like. According to some embodiments, image sensing unit 120 may include a monolithic integrated sensor, and/or may include a plurality of discrete components. According to some embodiments, image sensing unit 120 may include additional optical and/or electronic components such as color filters, lenses, amplifiers, analog to digital (A/D) converters, image encoders, control logic, and/or the like.

According to some embodiments, illumination unit 110 and image sensing unit 120 may have a fixed position relative to one another. For example, illumination unit 110 and image sensing unit 120 may be coupled to each other by a rigid member 122 and/or may be disposed within a same enclosure/chassis. In some examples, one or more light sources of illumination unit 110 and image sensing unit 120 may be substantially collocated in space. For example, first light source 112 may be substantially collocated with image sensing unit 120, while second light source 114 may be located behind image sensing unit 120 relative to scene 150. In some examples, however, illumination unit 110 and image sensing unit 120 may move independently of one another.

To determine the depth of one or more points of interest in scene 150, image sensing unit 120 is configured to capture a first image of scene 150 while illumination unit 110 illuminates scene 150 from a first position and a second image of scene 150 while illumination unit 110 illuminates scene 150 from a second position. As depicted in FIG. 1, the first and second positions are separated by a distance Δ along an illumination or displacement axis 123. Displacement axis 123 is preferably parallel to an optical axis 124 of image sensing unit 120. In other embodiments, displacement axis 123 may be approximately or generally parallel to optical axis 124 to still achieve the objectives of the disclosure. In some embodiments, displacement axis 123 may not be parallel or generally parallel to optical axis 124, although having a large angle between displacement axis 123 and optical axis 124 may reduce the accuracy of imaging system 100.

In some examples, illumination unit 110 is oriented such that points of interest in scene 150 (i.e., points for which depth estimates are desired) are located near displacement axis 123. According to the inverse square law, the measured intensity of a point of interest appearing in the first and second images is inversely proportional to the square of the distance of the point of interest in scene 150 from the first and second positions of illumination unit 110, respectively. As a consequence of the inverse square law, when the point of interest is far from illumination unit 110 relative to the distance $\Delta$, the measured intensity of the point of interest is nearly the same in each of the first and second images. On the other hand, when the point of interest is close to illumination unit 110 relative to $\Delta$, the measured intensity of the point of interest is significantly smaller in the second image than the first image. Accordingly, the depth of one or more points of interest in scene 150 may be determined based on the relative intensity of the first and second images (e.g., based on a ratio of the measured intensity of the point of interest in the first and second images).

Advantageously, this approach is robust to the albedo (overall reflectance) of the point of interest because the ratio of the measured intensities is independent of the albedo. For example, points of interest in an image corresponding to a dark colored object and a light colored object may each be determined accurately using this approach. Another advantage of this approach is that it is suitable for environments and/or applications in which other depth estimation techniques are less well-suited. For example, infrared techniques are generally not well suited for use in underwater environments because water absorbs infrared light, whereas the present approach may use visible light and/or other wavelengths suitable for underwater imaging. Likewise, ultrasonic techniques are generally not well suited for use in noisy environments because such techniques often have a low signal to noise ratio, whereas the present approach is not affected by a noisy environment.

Illumination unit 110 is capable of illuminating scene 150 from the first position and the second position. In furtherance of such embodiments, illumination unit 110 may include a plurality of light sources, each light source having a distinct optical path to scene 150. For example, as depicted in FIG. 1, illumination unit 110 may include a first light source 112 located at the first position and a second light source 114 located at the second position. The light intensity output by each of light sources 112 and 114 may be the same and/or similar to one another. In some examples, light sources 112 and 114 are arranged such that displacement axis 123 (which passes through a center of each of the light sources) passes near the points and/or regions of interest in scene 150.

One challenge associated with using a plurality of illumination sources is that a light source that is closer to scene 150 (e.g., first light source 112) may cast a shadow on portions of scene 150 when scene 150 is illuminated by a light source that is further from scene 150 (e.g., second light source 114). According to some embodiments, imaging system 100 may not be capable of accurately measuring the depth of objects located in portions of scene 150 that are affected by shadowing. Accordingly, when illumination unit 110 includes a plurality of light sources, a variety of techniques may be used to mitigate the effect of shadowing of more distant light sources. In some examples, the closer light source (e.g., first light source 112) may be moved out of the way—manually or automatically—when the more distant light source (e.g., second light source 114) is being used to reduce or eliminate shadowing. In some examples, the closer light source may have a small form factor to reduce the area of the shadow it casts. For example, the closer light source may be implemented using light emitting diodes, which are often available in small sizes (e.g., under 1 $cm^2$ in area). In some examples, the closer light source may be moved to several different positions when the more distant light source is being used. That is, the positional relationship between the first and second light sources may be varied. In furtherance of such embodiments, image sensing unit 120 may capture a plurality of images corresponding to each of the different positional relationships in order to form a synthetic image with little or no shadowing. For example, the synthetic image may be formed by calculating the maximum measured intensity at each point in the plurality of images.

In addition to or instead of modifying the hardware configuration of imaging system 100 to mitigate the effect of shadowing, image processing techniques, such as digital image processing techniques, may be used. For example, the presence of shadows may be determined based on the absolute or relative measured intensity and/or likely location of shadows within the images. The effect of the detected shadows may then be estimated and removed through calibration, scaling, and/or other correction factors that may be pre-computed or dynamically computed and applied during image processing to compensate for the effect of shadowing in the captured images.

Another way to mitigate the effect of shadowing is to use a single illumination source to provide illumination from the first and second positions. That is, the single illumination source is switchably provided with at least two distinct optical paths to scene 150. For example, illumination unit 110 may include a single movable light source capable of translating between the first position and second position. In some examples, the position of the movable light source may be manually and/or automatically adjusted. In some examples, the single light source may be stationary. In furtherance of such embodiments, illumination unit 110 may include switchable and/or adjustable optical components, such as movable lenses and/or mirrors, that are capable of varying the apparent position of the stationary light source between the first and second positions.

According to some embodiments, image sensing unit 120 may be configured to capture images in addition to the first and second images. In some examples, the first and second images may be selected from among a sequence of three or more images captured by image sensing unit 120. In some embodiments, image sensing unit 120 may continuously acquire images at a video frame rate.

According to some embodiments, illumination unit 110 may be operated in a flash mode, in which illumination unit 110 temporarily provides illumination to scene 150 when performing depth estimation and does not provide illumination to scene 150 otherwise. The flash mode of illumination unit 110 may be suitable for applications where scene 150 is illuminated by ambient light and/or when the primary purpose of imaging system 100 is to perform depth estimation. However, according to some embodiments, image sensing unit 120 may be operated in a reverse flash mode, in which illumination unit 110 continuously provides illumination to scene 150 under normal conditions and temporarily turns off one or more light sources when performing depth estimation. The reverse flash mode of illumination unit 110 may be suitable for applications where scene 150 is not illuminated by ambient light and/or when it is desired to capture images and/or video for applications other than depth estimation. For example, the reverse flash mode may be used when navigating an endoscope through an anatomical passageway: under normal conditions, illumination unit 110 illuminates the anatomical passageway to perform endoscopy, but from time to time, the operator may want to perform depth estimation or obtain a depth map, in which case illumination unit 110 and/or portions thereof are temporarily turned off to provide illumination from the first and second positions.

According to some embodiments, processing unit 130 may include one or more processor components, memory components, storage components, display components, user interfaces, and/or the like. For example, processing unit 130 may include one or more microprocessors, application-specific integrated circuits (ASICs) and/or field programmable gate arrays (FPGAs) adapted to convert raw image data into output image data. The output image data may be formatted using a suitable output file format including various uncompressed, compressed, raster, and/or vector file formats and/or the like. According to some embodiments, processing unit 130 may be coupled to image sensing unit 120 and/or various other components of imaging system 100 using a local bus and/or remotely coupled through one or more networking components, and may be implemented using local, distributed, and/or cloud-based systems and/or the like.

Processing unit 130 receives the first and second images from image sensing unit 120 and performs depth estimation. According to some embodiments, the depth is estimated based on an intensity difference between the first and second images. As discussed previously, when a point of interest is located far from illumination unit 110 the intensity difference is expected to be small, whereas when a point of interest is located close to illumination 110 the intensity difference is expected to be large. The mathematical relationship between the depth estimate and the intensity difference is given by:

$$d_1 = \frac{\Delta}{\rho\left(\frac{m_1}{m_2}\right) - 1} \left[ \cos(\alpha) + \sqrt{\cos^2(\alpha) + \rho\left(\frac{m_1}{m_2}\right) - 1} \right] \quad \text{Eq. 1}$$

In Eq. 1, $d_1$ represents the estimated depth of a point of interest from the first position of illumination unit 110, $\Delta$ represents the distance between the first and second positions of illumination unit 110, and $m_1$ and $m_2$ represent the measured intensities of the point of interest in the first and second images corresponding to the first and second positions, respectively $$\left(\text{i.e., } \frac{m_1}{m_2}\right)$$

represents me relative intensity of the point of interest in the first and second images). The variables $\rho$ and $\alpha$ are determined based on the position and orientation of the point of interest and are described below with reference to FIG. 2A.

Figure 2A:
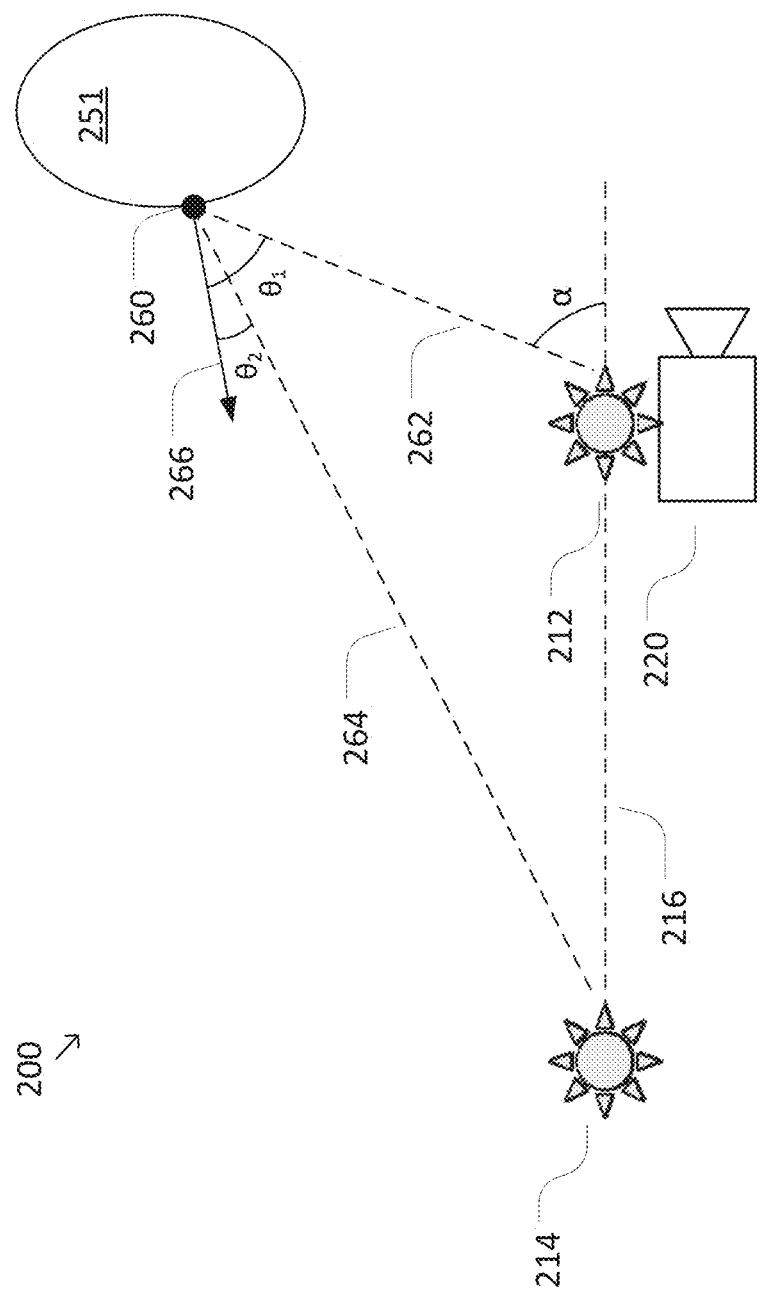
FIG. 2A illustrates an imaging apparatus according to some embodiments.

FIG. 2A illustrates an imaging apparatus 200 according to some embodiments. Light sources 212 and 214, image sensing unit 220, and object 251 generally correspond to light sources 112 and 114, image sensing unit 120, and object 151 described above with respect to FIG. 1. An illumination or displacement axis 216 represents the line passing through a center of each of light sources 212 and 214. In general, it is desirable for object 251 to be located along and/or near displacement axis 216. However, for clarity, object 251 is depicted as being located far from displacement axis 216 to illustrate features of the invention as described below. Moreover, in some embodiments, it may not be feasible to align displacement axis 216 with object 251 due to physical constraints, convenience, desire to capture wide angle images, and/or the like.

A point of interest 260 is located on a surface of object 251. Displacement vectors 262 and 264 represent the distance between point of interest 260 and light sources 212 and 214, respectively. A surface normal vector 266 represents the surface normal of object 261 at point of interest 260. As depicted in FIG. 2A, $\alpha$ represents the angle between displacement axis 216 and displacement vector 262, $\theta_1$ is the angle between surface normal vector 266 and displacement vector 262, and $\theta_2$ is the angle between surface normal vector 266 and displacement vector 264.

In Eq. 1, $\rho$ is a ratio given by $$\frac{\cos \theta_1}{\cos \theta_2}$$

and is used to scale the relative intensity $$\frac{m_1}{m_2}$$

to account for the difference in angular reflectance (i.e., the variation in the intensity of reflected light based on the angle between the surface normal and the incident light) assuming a Lambertian surface. Accordingly, $\rho$ may be used as a correction factor. In practice, the values of $\theta_1$ and $\theta_2$ may be unknown. In such a case, an equal angle assumption may be applied, where $\theta_1$ and $\theta_2$ are assumed to be the same and $\rho$ is assumed to be 1. Applying the equal angle assumption, Eq. 1 reduces to:

$$d_1 = \frac{\Delta}{\left(\frac{m_1}{m_2}\right) - 1} \left[ \cos(\alpha) + \sqrt{\cos^2(\alpha) + \left(\frac{m_1}{m_2}\right) - 1} \right] \quad \text{Eq. 2}$$

Advantageously, the value of each variable on the right hand side of Eq. 2 is known and/or may be determined based on the first and second images. As a result, Eq. 2 provides a straightforward calculation of $d_1$. Moreover, as discussed previously, the depth estimate obtained using Eq. 2 is independent of the albedo of the point of interest because the estimate is independent of the absolute measured intensities $m_1$ or $m_2$. Rather, the depth estimate depends on the relative intensity $$\frac{m_1}{m_2}.$$

it is further noted that $d_1$ is directly proportional to $\Delta$ in Eq. 2, which means that $d_1$ may be expressed in units of $\Delta$ (i.e., the depth of a point of interest may be described as n times the separation between the first and second positions of the illumination unit). Accordingly, the accuracy and/or noise sensitivity of the depth estimate may depend on $\Delta$. In some examples, the value of $\Delta$ may be adjustable to optimize the accuracy and/or noise sensitivity of the depth estimate. For example, light sources 112 and/or 114 may be movable and may be positioned based on applying a linear relationship between the size of the scene and the optimal spacing between the first and second positions.

The accuracy of a depth estimate obtained using Eq. 2 depends in part upon the validity of the equal angle assumption. In general, the equal angle assumption is valid for points of interest located along and/or near displacement axis 216. For such points of interest, $\theta_1$ and $\theta_2$ are approximately equal to each other, and the assumption that $\rho$ is approximately 1 is valid. Similarly, when surface normal vector 266 is oriented facing towards light sources 212 and 214, even if the point of interest is not located along and/or near displacement axis 216, both $\theta_1$ and $\theta_2$ are approximately zero and the assumption that $\rho$ is approximately 1 is valid. However, when the point of interest is not located along and/or near displacement axis 216 and surface normal vector 266 is oriented facing away from light sources 212 and/or 214 (i.e., when $\theta_1$ and $\theta_2$ are large and different from one another), the assumption that $\rho$ is approximately 1 is unlikely to provide an accurate depth estimate. Accordingly, in some applications it would be desirable to improve the accuracy of the depth estimate in cases where the equal angle assumption ($\rho=1$) is not valid. That is, when the difference in reflectance due to the angle of incoming and outgoing light between the first and second images has a significant impact on the depth estimate, a correction should be made to improve the accuracy of the depth estimate.

One way to improve the depth estimate is to estimate the orientation of surface normal vector 266 and use the estimated surface normal vector 266 to estimate the Lambertian correction factor $\rho$. The estimated value of $\rho$ may then be used to solve Eq. 1. A variety of techniques may be used to estimate the orientation of surface normal vector 266. In some examples, the value of $\rho$ cannot be estimated by inspection of a single pixel corresponding to point of interest 260 in the first and second images. Instead, a plurality of pixels near point of interest 260 may be used. In some examples, the surface of object 251 may be assumed to be planar at point of interest 260. In such examples, surface normal vector 266 may be estimated based on a neighborhood of pixels corresponding to object 251. The neighborhood of pixels includes a small group of pixels near point of interest 260 that are assumed to lie on the same tangent plane as point of interest 260. By considering the neighborhood of nearby pixels, there is sufficient information to estimate surface normal vector 266. Because a tangent plane may be uniquely described by three quantities (e.g., depth and two quantities to describe the plane orientation, such as angles relative to displacement axis 216, surface normals, and/or gradients in two directions), the neighborhood of pixels may include as few as three pixels. In some examples, the neighborhood of pixels may include more than three pixels to improve robustness in view of the surface geometry, measurement noise, and/or distance of the pixels from displacement axis 216.

A variety of techniques and optimization methods may be used to accurately estimate surface normal vector 266 based on the neighborhood of pixels near point of interest 260. One simple method is to alternatively solve for the depth and surface normal at the point of interest while assuming a current estimate of the alternate variable. With each cycle of alternately solving for the depth and surface normal, the accuracy of the depth and surface normal estimates is expected to improve. The particular process may include the following steps. First, upon receiving the first and second images, Eq. 2 is solved for each pixel in the images to obtain an initial depth estimate for each pixel. Next, the orientation of the tangent plane at each pixel is estimated based on a small neighborhood of nearby pixels. Such an estimate may be obtained, for example, using a least squares regression to find the plane of best fit for the neighborhood of pixels. Once the orientation of the tangent plane is estimated, the surface normal vector is computed and used to determine $\theta_1$ and $\theta_2$. Based on the values of $\theta_1$ and $\theta_2$, $\rho$ is estimated, and Eq. 1 is used to obtain improved depth estimates at each pixel. To the extent that further accuracy is desired, the process may be repeated using the improved depth estimates. It is to be understood that this relatively simple optimization technique is presented for illustrative purposes. A variety of other optimization techniques may be employed, some of which may be more accurate and/or efficient than the example above.

Derivation of Scaling Function

Consider a scene entirely illuminated from a single light source. According to the inverse square law, the amount of light that falls on a small planar region with a fixed area oriented normally to the direction of light propagation is inversely proportional to the squared distance between the light source and the plane. If the plane is not oriented normal to the direction of propagation, the amount of light falling on it is reduced. Let $d_i$ be the distance between the light source and the center of the plane. Let $\theta_i$ be the angle between the plane's normal and the direction of the propagation of light. The amount of light falling on a plane at such an orientation and distance from the light source is proportional to $$\frac{\cos\theta_i}{d_i^2}.$$

Consider an object in the scene and a small plane normal to the object's surface at a point. Some of the incident light will be reflected off this point and be measured by the imaging system. The measurement will be given by $$m_i = c * \left(\frac{\cos\theta_i}{d_i^2}\right) \qquad \text{Eq. 3}$$

where c is a constant that takes into account the object's albedo, brightness of the illumination unit, and the camera's optical to electronic conversion. Note this constant does not depend on the object's distance or orientation relative to the camera. Here the measurements are assumed to be linearly related to the amount of light, which means no post-processing, such as a gamma transform, is applied.

Consider the first point in the first image that corresponds to point of interest 260. Also consider the second point in the second image that corresponds to point of interest 260. Let $m_1$ and $m_2$ be the values at these points in the first image and second image, respectively. The following equations are used to model the measurements.

$$m_2 = k * \left(\frac{\cos\theta_2}{d_2^2}\right) \qquad \text{Eq. 4}$$

-continued $$m_1 = k * \left(\frac{\cos\theta_1}{d_1^2}\right) \qquad \text{Eq. 5}$$

Notice the same constant k has been used in both equations because of no changes to the overall system. For example the object's albedo is the same because the camera and scene are assumed to not have moved. The intensity of the illumination unit during capture of the first and second images has been assumed to be equal or scaled appropriately. In some examples, the same camera may be used so the optical to electronic conversion is assumed to be the same for both images or already removed.

Additionally the bidirectional reflectance distribution function is assumed to have approximately equal values for the corresponding directions of displacement vectors 262 and 264. Such assumption is valid for many objects that are approximately Lambertian. This assumption is valid for most objects and typical arrangements of the hardware because displacement vectors 262 and 264 may be approximated as the same direction. This assumption may be invalid for specular surfaces near geometric configurations that may generate a specular reflection from one illumination unit to the imaging system. However, such specular reflections may only occur for specific geometric orientations, and therefore permit determination of the surface normal and estimation of the depth.

Eqs. 4 and 5 can be combined to eliminate the constant c and give:

$$\frac{m_1 d_1^2}{\cos\theta_1} = \frac{m_2 d_2^2}{\cos\theta_2} \qquad \text{Eq. 6}$$

Let $$\rho = \frac{\cos\theta_2}{\cos\theta_1}.$$

Then Eq. 6 can be solved to give the following.

$$d_2^2 = \frac{m_1}{m_2}\rho d_1^2 \qquad \text{Eq. 7}$$

Value of ρ

The value of ρ can be reasonably assumed to be 1, which means $\cos\theta_1 = \cos\theta_2$ and will be referred to as the equal angle assumption. For example, the assumption is valid for objects that have surface normals approximately in the direction of the illumination unit at the first and second positions. For these surfaces $\cos\theta_1$ and $\cos\theta_2$ are each near 1. Since the cosine function is relatively flat (derivative near 0) for cosine values near 1, small variations in the angle give approximately the same cosine value. Therefore surfaces with such shapes meet the assumption despite their position. In the simplest form, the disclosed methods may be run using a value of 1 for all points.

Geometry

Consider the triangle formed by the observed point in the scene and the illumination units 212 and 214. One side of the triangle is displacement vector 262, which has length $d_1$. Another side of the triangle is displacement vector 264, which has length $d_2$. The third side of the triangle, the displacement between illumination units 212 and 214, has length A. The following equation results from applying the law of cosines to the triangle.

$$d_2^2 = d_1^2 + \Delta^2 - 2\Delta d_1 \cos(\pi - \alpha) \qquad \text{Eq. 8}$$

This can be simplified by applying a trigonometric identity.

$$d_2^2 = d_1^2 + \Delta^2 + 2\Delta d_1 \cos(\alpha) \qquad \text{Eq. 9}$$

Eqs. 7 and 9 can be combined to obtain the following equation.

$$\frac{m_1}{m_2}\rho d_1^2 = d_1^2 + \Delta^2 + 2\Delta d_1 \cos(\alpha) \qquad \text{Eq. 10}$$

Solve the quadratic equation to find the distance from the illumination unit 212.

$$d_1 = \frac{\Delta}{\rho\frac{m_1}{m_2} - 1}\left(\cos(\alpha) + \sqrt{\cos^2(\alpha) + \rho\frac{m_1}{m_2} - 1}\right) \qquad \text{Eq. 11}$$

It is observed that Eq. 11 is equivalent to Eq. 1, and applying the equal angle assumption (ρ=1) to Eq. 11 results in Eq. 2. This solution provides the depth from the front flash for each point in the image. Note the distance only depends on the ratio of the two measurements. Therefore the method is robust to the object's albedo, the overall reflectance of the object, because it equally scales both measurements. The formula makes intuitive sense because very distant objects result in measurements that are approximately equal, giving ratios slightly larger than 1, which makes the right side of Eq. 11 large. For close objects the front measurement is much brighter, giving ratios significantly larger than 1, which makes the right side of Eq. 11 small.

Notice that for the point in the scene along displacement axis 216 such that a is 0, Eq. 2 reduces to Eq. 0, which assumes that all points in the scene lie along displacement axis 216. Because the assumption that all points lie along displacement axis 216 is not valid for many points in a scene, Eq. 2 generally provides more accurate depth estimates than Eq. 0 for points in the scene that are not along or very close to displacement axis 216. More specifically, Eq. 2 accounts for the actual Euclidean distances of displacement vectors 262 and 264, not simply their projections along displacement axis 216. The depth bias between the two estimates provided by Eq. 0 and Eq. 2 is given by the following equation:

$$\frac{\hat{d}_1}{d_1} = \frac{\sqrt{\frac{m_1}{m_2}} + 1}{\cos(\alpha) + \sqrt{\cos^2(\alpha) + \frac{m_1}{m_2} - 1}}$$

The depth estimates using Eq. 0 from the prior art are systematically larger than the actual depth, especially for large a values.

Figure 2B:
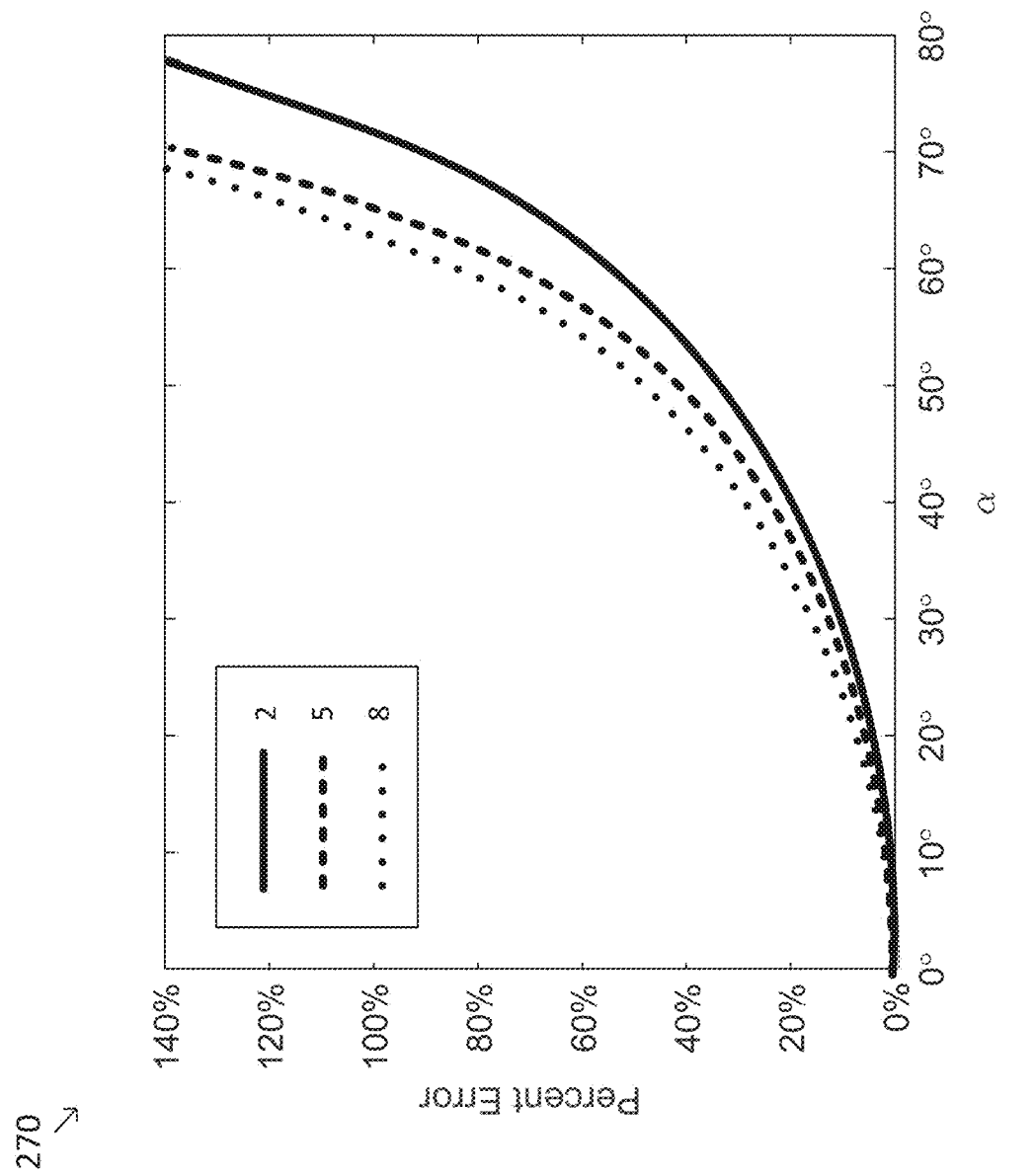

FIG. 2B illustrates a plot 270 of the percent error in the depth estimates caused by using Eq. 0 compared to Eq. 2 as a function of a. The legend of plot 270 shows the distance from the first illumination position as expressed in units of Δ. As illustrated in FIG. 2B, if $d_1 \geq 2\Delta$ there is at least a 10% error when $\alpha \geq 30°$ and at least a 25% error when $\alpha \geq 45°$. These errors are too large for many imaging applications. Advantageously, the techniques described in the present application reduce or eliminate these errors.

Referring back to FIG. 1, according to some embodiments, illumination unit 110 may be capable of illuminating scene 150 from more than two positions. If each of the more than two positions are collinear, images captured while scene 150 is illuminated from each of the more than two positions may be used to more accurately estimate depth due to the increased number of images and data sources. For example, images from a pair of positions far from scene 150 may be used for points of interest relatively far from the line passing through the more than two positions. Advantageously, this reduces the value of a in Eqs. 1 and 2 relative to a pair of positions close to scene 150. It is possible for one skilled in the art to generalize the depth estimation methods previously described for images acquired using a pair of illumination positions to an arbitrarily large number of illumination positions.

In some examples, the more than two positions may not be collinear. Such an arrangement may allow for more robust depth estimates in regions of scene 150 that are occluded when illuminated from one or more of the positions. Additionally, the depth accuracy, robustness to different types of scenes, and/or the simplicity/speed of depth estimation may be improved by using more illumination positions. One reason for this is the increased possibility to find a pair of positions such that a given point in the scene is close to the corresponding axis of displacement defined by the given pair of positions, which makes a small and increases the validity of the equal angle assumption. According to some examples, illumination unit 110 may include a single 'front' light source located closer to scene 150 and a plurality of 'back' light sources located further from scene 150. In furtherance of such examples, pairs of light sources including the front light source and one of the plurality back light sources may be selected based on the location of the point of interest in scene 150 to optimize the depth estimate.

Figure 3:
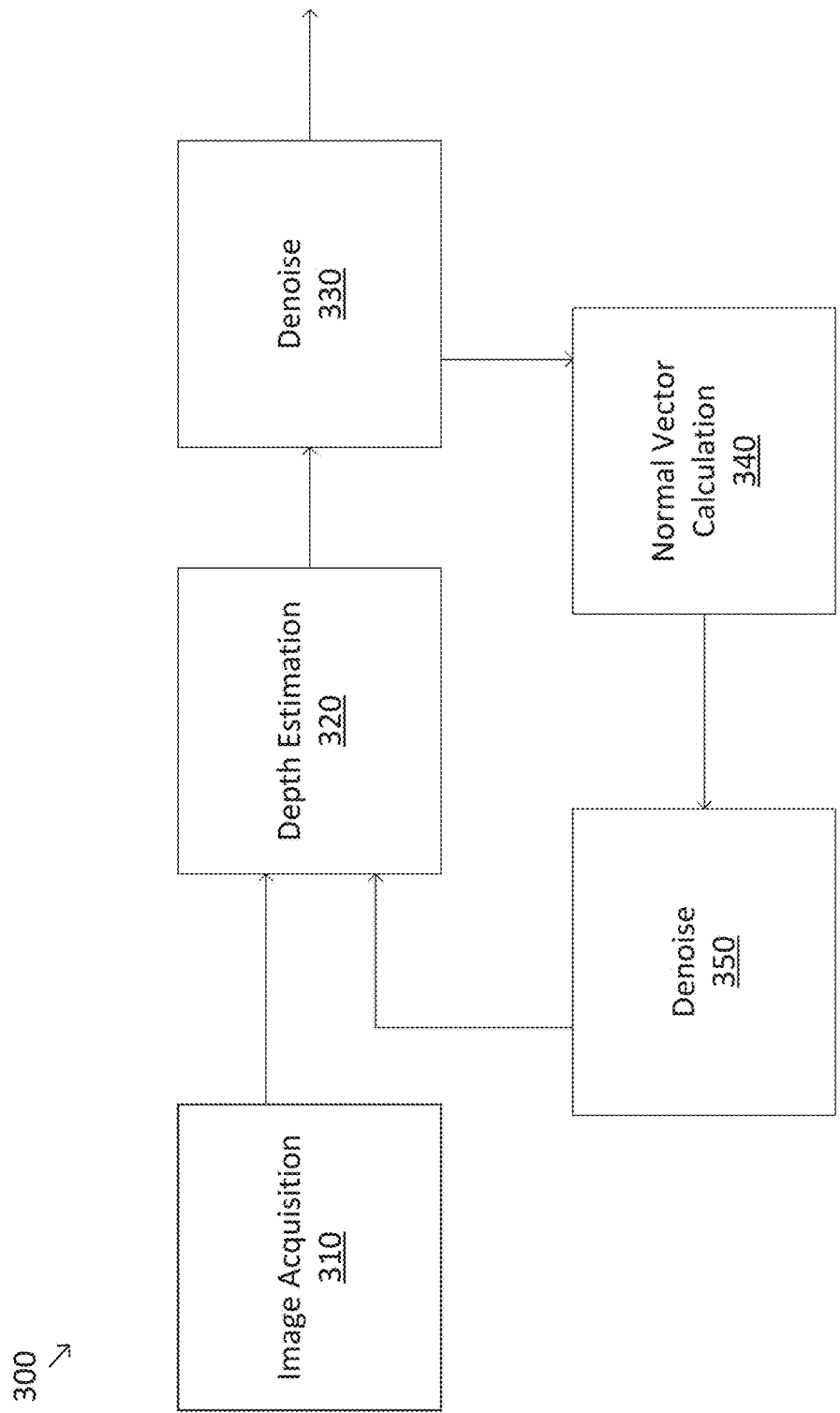
FIG. 3 illustrates an image processor for depth estimation according to some embodiments.

FIG. 3 illustrates an image processor 300 for depth estimation according to some embodiments. According to some embodiments consistent with FIGS. 1-2, image processor 300 may be used to implement processing unit 130 and/or may be used to estimate the depth of one or more points of interest based on the first and second images captured using image sensing unit 120. In some examples, image processor 300 may include a plurality of modules 310-350. According to some embodiments, modules 310-350 may be hardware-defined, software-defined, virtual, and/or a combination thereof.

An image acquisition module 310 receives first and second images of a scene. In some examples, the first and second images may correspond to the first and second images of scene 150. Accordingly, the first and second images may be captured while the scene is illuminated from a first and second position, respectively.

A depth estimation module 320 receives the first and second images from image acquisition module 310 and estimates the depth of one or more features appearing in the first and second images. According to some embodiments, the depth estimate may be based on an intensity difference between the first and second images, an orientation of the one or more features, and/or a combination thereof. In some examples, the one or more features may include a point of interest on a surface of an object, such as objects 151-159. In furtherance of such embodiments, the orientation of the feature may be determined based on a surface normal vector of the surface of the object. In some examples, the depth estimate may be calculated using Eq. 1 and/or Eq. 2. Eq. 2 is used when the equal angle assumption is valid and/or when no estimate of the feature orientation is available. Eq. 1 is used otherwise. According to some examples, the depth may be estimated for a continuous region of the first and second images, in which case a depth map of the region is formed. The region may include all or a portion of the first and second images.

A denoising module 330 receives the depth map from depth estimation module 320 and denoises the depth map. A variety of denoising techniques may be applied to the depth map. In some example, a separable median filter, a bilateral filter, and/or a combination thereof may be applied. In addition to general noise considerations, denoising module 330 is particularly useful for addressing the noise amplification due to the configuration of image processor 300. In some examples, noise amplification may occur when the ratio of the first and second images is calculated by depth estimation module 320 (i.e., when computing term $$\frac{m_1}{m_2}$$

in Eqs 1 and 2). For example, photon shot noise appearing in the first and second images is amplified when the ratio is computed. In some examples, noise amplification may occur due to image processor 300 being arranged in a feedback loop. For example, deleterious edge effects (e.g., artifacts at the boundary of an object in the scene) may be amplified on each cycle of the feedback loop. Thus, denoising module 330 may be configured to address general photon shot noise, amplified photon shot noise that arises from the calculation of a ratio of two images, general edge effects, amplified edge effects that arise from the feedback loop, and/or the like.

A normal vector calculation module 340 receives the denoised depth map from denoising module 330 and calculates a normal vector corresponding to each pixel in the depth map. Normal vector calculation module 340 outputs a normal vector map. As discussed previously, the normal vector at a given pixel may be estimated based on a neighborhood of nearby pixels. For example, a tangent plane may be determined by determining the plane that best fits the neighborhood of nearby pixels. In some examples, the best fit plane may be determined using a least squares regression. In some examples, the normal vector may be determined using a quadruplet of vector pairs, as illustrated by FIG. 4.

Figure 4:
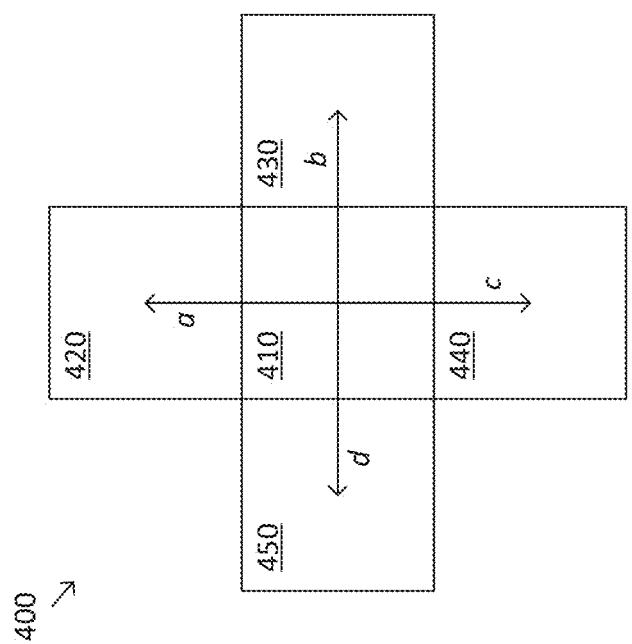
FIG. 4 illustrates a neighborhood of pixels used to determine the normal vector of a center pixel using vector pairs according to some embodiments.

FIG. 4 illustrates a neighborhood of pixels 400 used to determine the normal vector of a center pixel 410 using vector pairs according to some embodiments. Three dimensional displacement vectors $\vec{a}$, $\vec{b}$, $\vec{c}$, and $\vec{d}$ measuring the displacement between pixel 410 and four neighboring pixels 420-450 are determined based on the depth map and the location of the pixels in the image. Next, the following four cross products are computed: $\vec{a} \times \vec{b}$, $\vec{b} \times \vec{c}$, $\vec{c} \times \vec{d}$, and $\vec{d} \times \vec{a}$. Finally, the median of the four cross products is determined and used as an estimate of the normal vector at center pixel 410.

Referring back to FIG. 3, a denoising module 350 receives the normal vector map from normal vector calculation module 340 and denoises the normal vector map. Like denoising module 330, denoising module 350 may include a median filter and a bilateral filter to mitigate edge effects and photon shot noise in the normal vector map.

Depth estimation module 320 receives the denoised normal vector map from denoising module 350 and recalculates the depth map using Eq. 1. The value of ρ in Eq. 1 is determined using the received normal vector map. Thus, rather than applying the simplifying assumption that ρ=1 (or some other initial value) as in the initial pass, an improved estimate of depth is obtained on the second pass because a more accurate value of ρ is used.

According to some examples, the number of cycles of alternately computing the depth map via depth estimation module 320 and normal vector map via normal vector calculation module 340 may be predetermined (e.g., two passes through depth estimation unit 320). In some examples, image processor 300 may continuously refine the depth estimate by cycling through modules 320-350 until a target condition is satisfied. For example, a target condition may include convergence, as may be indicated by a difference between the depth maps generated by consecutive cycles falling below a predetermined threshold. When the processing is complete, image processor 300 outputs the depth map for display, storage, subsequent processing, and/or the like.

Figure 5:
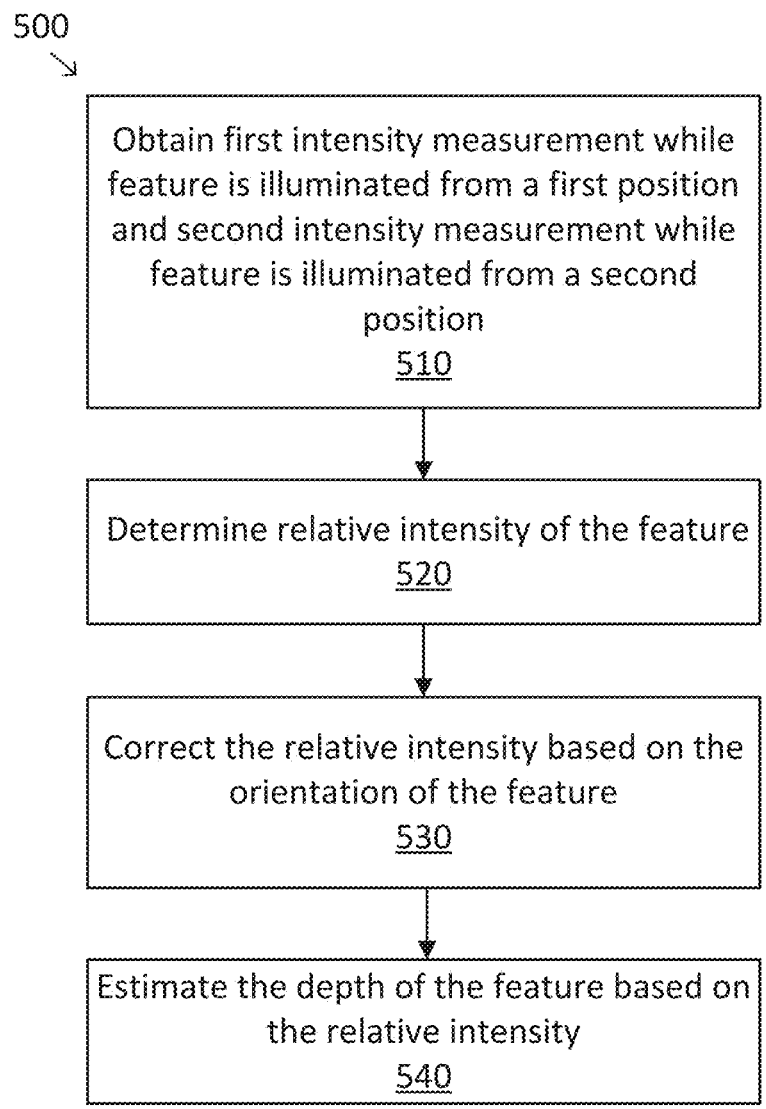
FIG. 5 illustrates a method for estimating the depth of a feature according to some embodiments.

FIG. 5 illustrates a method 500 for estimating the depth of a feature according to some embodiments. According to some embodiments, method 500 may be performed by a processor, such as processing unit 130 in FIG. 1 and/or image processor 300 in FIG. 3.

With reference to FIGS. 1 and 5, at a process 510, a first intensity measurement corresponding to the feature is obtained while the feature is illuminated from a first position and a second intensity measurement corresponding to the feature is obtained while the feature is illuminated from a second position apart from the first position. According to some embodiments, the first and second intensity measurements are captured using a sensor, such as image sensing unit 120. According to some embodiments, the sensor is in the same position when capturing the first and second intensity measurements.

At a process 520, the relative intensity of the feature is determined. According to some examples, the relative intensity of the feature may be determined by calculating a ratio of the first and second intensity measurements. In some embodiments, the relative intensity of the feature is independent of the albedo of the feature.

At an optional process 530, the relative intensity determined at process 520 is corrected based on the orientation of the feature. As discussed previously with respect to FIGS. 1-4, the orientation of the feature relative to the first and second positions of the illumination unit may affect the relative intensity of the feature as determined at process 520. In particular, when the feature is not located along or near the axis of displacement of the first and second positions and when the angle between the surface normal vector of the feature and the first and/or second positions is large, it may be desirable to correct the relative intensity using a scaling factor that accounts for Lambertian reflectance. A scaling factor of 1 indicates no correction. According to some embodiments, the correction may be larger (i.e., the scaling factor may be further from 1) when the feature is positioned farther from the axis of displacement than when the at least one feature is positioned closer to the axis of displacement. Similarly, the correction may be larger when the feature is oriented facing away from the illumination unit than when the at least one feature is oriented facing towards the illumination unit.

At a process 540, the depth of the feature is estimated based on the relative intensity, the relative intensity having been determined at process 520 and optionally corrected at process 530. In some embodiments consistent with FIGS. 1-4, the depth may be estimated using Eq. 1 and/or Eq. 2. In particular, Eq. 2 may be used when the scaling factor is unknown and/or otherwise not being used, and Eq. 1 may be used when the scaling factor is known.

Figure 6:
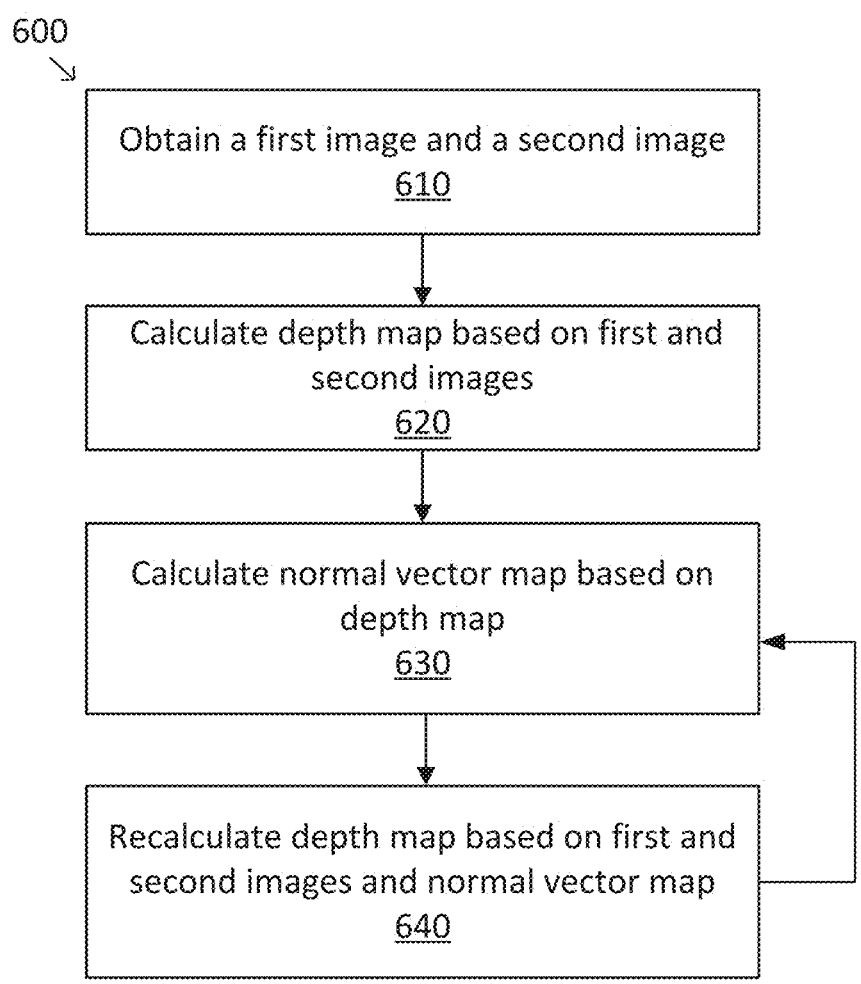
FIG. 6 illustrates a method for generating a depth map according to some embodiments.

FIG. 6 illustrates a method 600 for generating a depth map according to some embodiments. According to some embodiments, method 600 may be performed by a processor, such as processing unit 130 in FIG. 1 and/or image processor 300 in FIG. 3.

At a process 610, a first image and a second image of a scene are obtained. In some embodiments consistent with FIGS. 1-4, the first image may be captured while an illuminator illuminates the scene from a first position and the second image may be captured while the illuminator illuminates the scene from a second position apart from the first position. According to some embodiments, a plurality of images may be captured while the illuminator illuminates the scene from each of the first and second positions, where each of the plurality of images is captured at a different illumination intensity. Consistent with such embodiments, the first and second images may be synthesized from the plurality of images such that various regions within the scene are properly exposed (e.g., sufficiently bright to mitigate noise but not too bright as to cause saturation). According to some embodiments, process 610 may include receiving a stream of images, such as a video stream, and selecting the first and second images from among the frames of the image stream.

According to some embodiments, various image processing techniques may be applied to one or more of the first and second images before, during, and/or after being received during process 610. According to some embodiments, geometric distortions associated with the image sensing unit may be removed using techniques known to one skilled in the art. According to some embodiments, noise reduction techniques, such as adaptive blurring and/or other noise reduction techniques known to one skilled in the art, may be applied to the images. According to some embodiments, registration techniques may be applied to the first and second images to ensure that the features appearing in the first and second images are aligned with one another. According to some embodiments, problem regions, including regions where illumination is reflected directly from the illuminator back to the image sensing unit, causing local saturation, and/or regions that are not illuminated by illumination due to, e.g., shadowing, may be detected and corrected. According to some embodiments, the depth of problem regions that may not be accurately estimated using the techniques described in this application may instead be estimated using depth calculated from nearby regions through inpainting or hole filling algorithms and/or alternative techniques specifically developed for such problem regions. According to some embodiments, ambient light may be removed from the images. For example, a baseline image may be acquired at each position without any illumination from the illuminator, and the baseline image may be subtracted from the images with illumination from the illuminator to remove ambient light from the images with illumination from the illuminator. According to some embodiments, noise reduction techniques may be applied to the baseline images, particularly when the amount of ambient light is low and prone to noisy images.

At a process 620, a depth map is calculated based on the first and second images. In some examples, the depth map may be calculated based on the relative intensity of the first and second images. For example, a ratio of the first and second images may be computed to determine the relative intensity of the images. Advantageously, unlike absolute intensity, the relative intensity is independent of the albedo of the objects in the scene. According to some embodiments, the depth map may be calculated by applying Eq. 2 to each pixel in the first and second images. In some examples, the depth map may be filtered and/or de-noised during process 620. For example, the depth map may be filtered using a separable median filter and/or a bilateral filter.

According to some embodiments, method 600 may conclude at process 620. The depth map generated at process 620 may be output for display, storage, further processing, and/or the like. However, according to some embodiments, the depth map may undergo further refinement after process 620. In furtherance of such embodiments, method 600 may proceed to a process 630.

At a process 630, a normal vector map is calculated based on the depth map. According to some embodiments, the normal vector map identifies the tangent plane of the surface corresponding to each pixel in the depth map. As discussed previously, the normal vector at a given pixel may not be ascertainable from the corresponding pixel in the depth map alone. Instead, the normal vector is calculated based on a neighborhood of pixels near the corresponding pixel in the depth map. Based on the neighborhood of pixels, the tangent plane of the surface at each pixel may be determined by best fit (e.g., least squares regression), using vector pairs as illustrated in FIG. 4, and/or the like. The normal vector map is generated by calculating the normal vector at each pixel of the depth map. Like process 620, in some examples, the normal vector map may be filtered and/or de-noised during process 630. For example, the normal vector map may be filtered using a separable median filter and/or a bilateral filter.

At a process 640, the depth map is recalculated based on the first and second images obtained at process 610 and the normal vector map calculated at process 630. According to some embodiments, the depth map may be calculated by applying Eq. 1 to each pixel in the first and second images. Unlike process 620, where Eq. 2 was used because the Lambertian correction factor ρ was assumed to be 1, Eq. 1 is used at process 640 because p is capable of being determined from the normal vector map. Accordingly, when Eq. 1 is used to recalculate the depth map, process 640 includes the steps of calculating p for each pixel based on the normal vector map and calculating the depth map by applying Eq. 1 to each pixel of the first and second images.

According to some embodiments, method 600 may conclude after process 640. However, in some examples, method 600 may proceed back to process 630 to iteratively perform processes 630 and 640. According to some embodiments, processes 630 and 640 may be performed for a predetermined number of iterations and/or until convergence is achieved. In some examples, convergence is determined to be achieved when the difference between the depth maps generated during consecutive iterations falls below a predetermined threshold.

Figure 7:
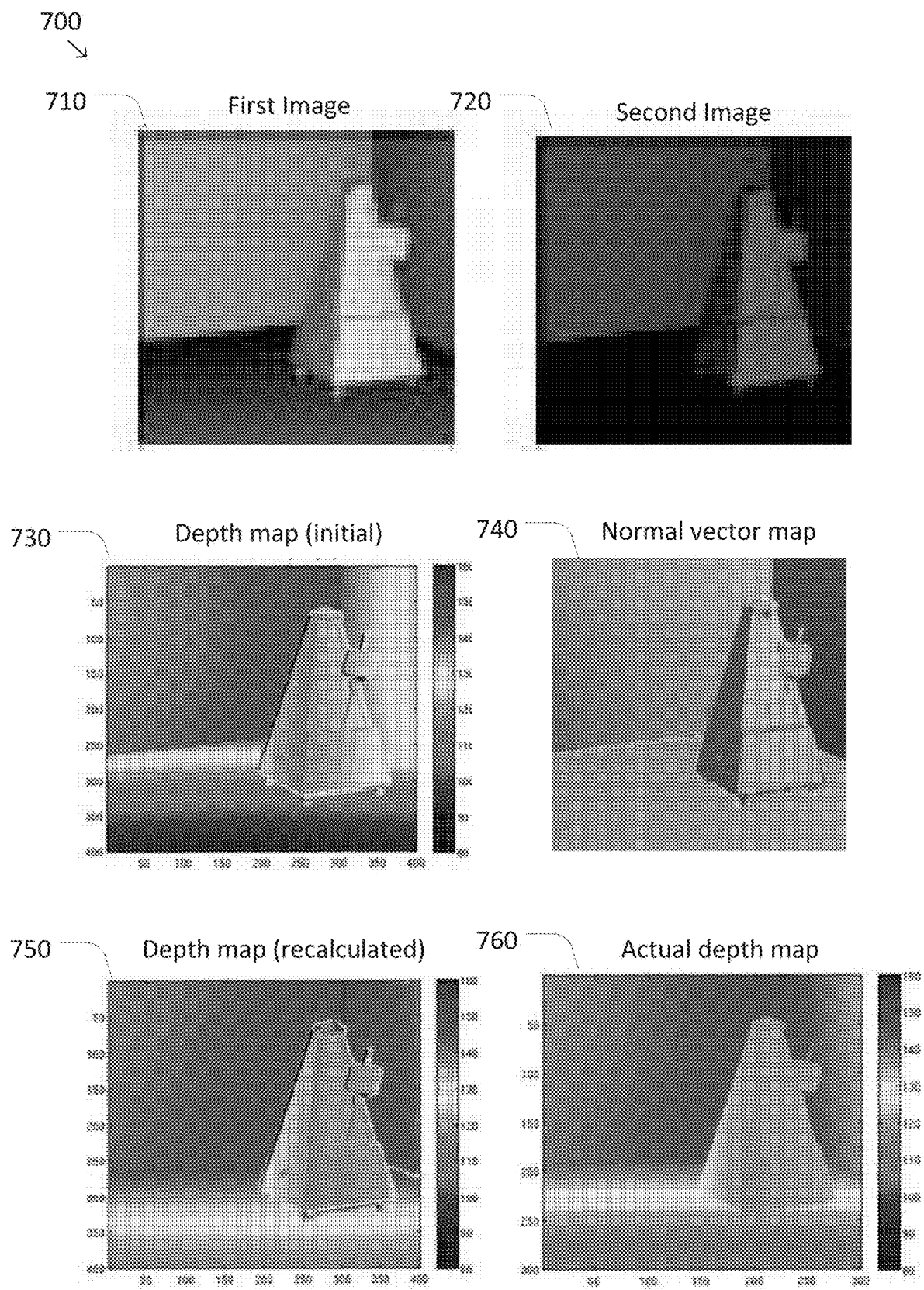
FIG. 7 illustrates an exemplary sequence of images corresponding to the steps of the method for generating a depth map according to some embodiments.

FIG. 7 illustrates an exemplary sequence of images 700 corresponding to the steps of method 600 according to some embodiments. A first image 710 and a second image 720 correspond to the first and second images, respectively, obtained during process 610. As observed in FIG. 7, first image 710 appears lighter than second image 720. This is expected because the first position of the illuminator is closer to the scene than the second position of the illuminator. An initial depth map 730 corresponds to the initial depth map generated during process 620. As observed in FIG. 7, initial depth map 730 includes several abrupt transitions in the depth estimate. For example, an abrupt transition from red-orange to yellow occurs where the back wall meets the floor. Intuitively it is known that the wall and the floor have the same depth at their intersection, indicating that the abrupt transition is an artifact of the depth estimation process. Accordingly, it would be desirable to refine initial depth map 730 to remove this artifact. A normal vector map 740 corresponds to the normal vector map generated during process 630. As expected, the floor is observed to have a different orientation than the back wall, as indicated by their different colors. A recalculated depth map 750 corresponds to the recalculated depth map generated during process 640. Unlike initial depth map 730, there is no abrupt transition at the intersection between the back wall and the floor. This represents an improvement relative to initial depth map 730. An actual depth map 760 is depicted for the purpose of comparison. It is observed that recalculated depth map 750 is generally a closer map to actual depth map 760 than initial depth map 730. The improvement is particularly apparent in regions far from the center of the first and second images and in regions oriented at steep angles relative to the camera perspective, such as the floor.

Figure 8:
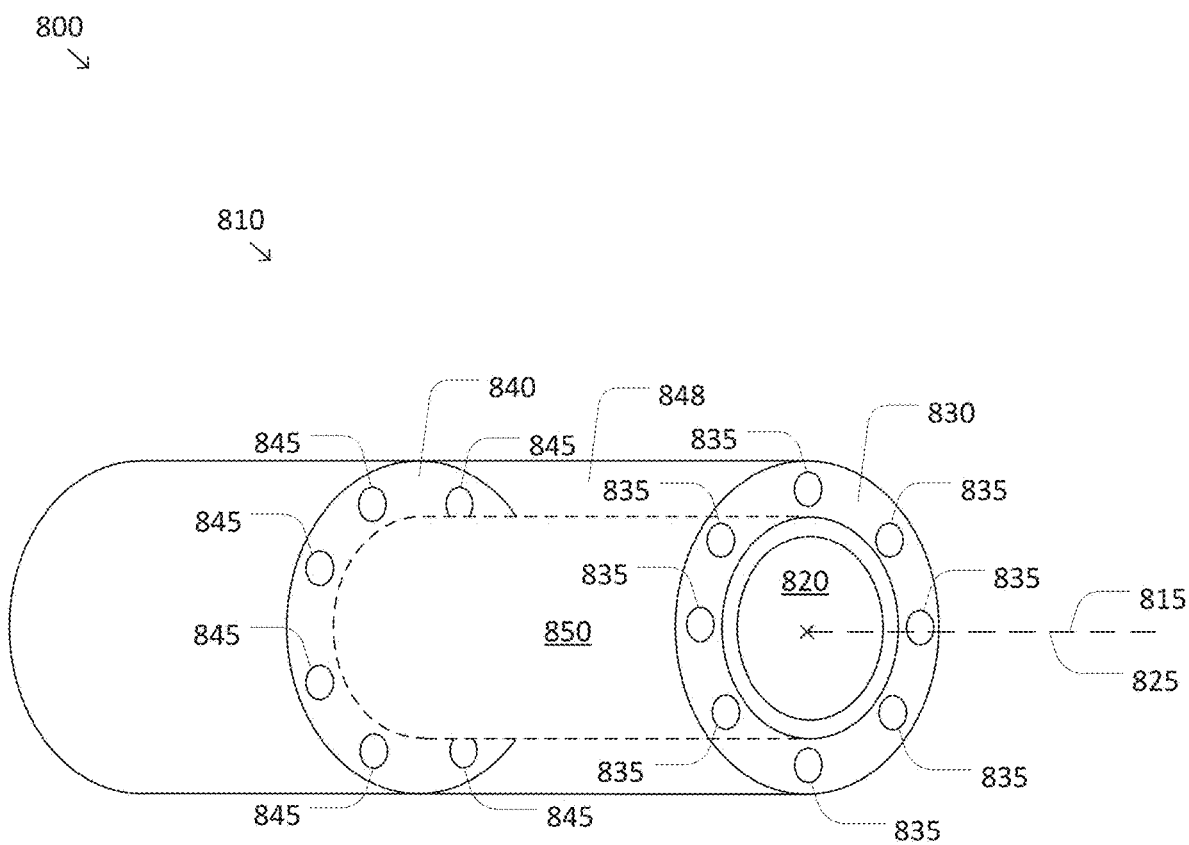
FIG. 8 illustrates an imaging apparatus with a ring flash according to some embodiments.

FIG. 8 illustrates an imaging apparatus 800 with a dual ring flash according to some embodiments. Imaging apparatus 800 includes an illumination unit 810 and an image sensing unit 820. According to some embodiments consistent with FIG. 1, illumination unit 810 may correspond to illumination unit 110 and image sensing unit 820 may correspond to image sensing unit 120.

According to some embodiments, one or more light sources of illumination unit 810 may be configured as a dual ring flash that includes a first or distal ring flash 830 at a first position and a second or proximal ring flash 840 at a second position proximal to the first position. In some examples, distal and proximal ring flashes 830 and 840 may be used in order to increase the output intensity, uniformity, and/or other desirable characteristic of the illumination. Distal ring flash 830 includes one or more light emitters 835 such as LED chips. Similarly, proximal ring flash 840 includes one or more light emitters 845. Light emitters 835 and 845 are in respective proximal and distal parallel planes and have respective centers in the respective planes. The centers of distal and proximal ring flashes 830 and 840 lie along an illumination or displacement axis 815 of illumination unit 810 that is generally collinear or parallel with an optical axis 825 of image sensing unit 820.

According to some embodiments, ring flashes 830 and 840 may be arranged such that, respectively, each of light emitters 835 and 845 is approximately the same distance from objects in the scene being imaged by image sensing unit 820. Consistent with such embodiments, the plurality of light emitters 835 and 845 may be arranged in a dual annular ring configuration. Alternatively, a monolithic version light emitters 835 and/or 845 may be implemented where the monolithic light emitter has an annular shape.

According to some embodiments, all or part of image sensing unit 820 may be located within distal ring flash 830 and/or proximal ring flash 840. For example, as depicted in FIG. 8, a portion of image sensing unit 820 corresponding to an objective lens is positioned at or near the center of distal ring flash 830. In some examples, this arrangement may be found to be advantageous for a number of reasons. First, nearly the entire portion of the scene within the field of view of image sensing unit 820 receives illumination from illumination unit 810. Second, it avoids a problem that may occur when a point emitter (e.g., a single light emitter) is placed such that there is a large angle between the line connecting image sensing unit 820 and an object in the scene and the line connecting illumination unit 810 and the object. Specifically, in the latter arrangement, it is possible that an object that is viewable to image sensing unit 820 is not illuminated by illumination source 810 due to an obstruction (e.g., shadowing). In some embodiments, the depth of a shadowed object in the scene cannot accurately be determined. Thus, when image sensing unit 820 is located within the ring of ring flash 830 and/or 840 the problem of shadowing may be reduced and/or eliminated.

According to some embodiments, ring flashes 830 and/or 840 may be oriented such that a line passing through the center of the annular region and normal to the plane containing light emitters 835 and/or 845 passes through a region of interest of the scene. This arrangement allows for each portion of ring flashes 830 and/or 840 to have an approximately equal distance to objects in the scene. For objects in the scene closer to one side of distal ring flash 830, the more intense illumination emitted by the closer portion of distal ring flash 830 may be approximately offset by the weaker illumination intensity emitted by the more distant portion of distal ring flash 830. Accordingly, distal ring flash 830 may be approximated as a single point light source located at the center of the annular region. The above depth estimation methods, such as methods 500 and/or 600 may therefore be applied to images acquired using such ring flashes as if they were acquired using a point light source of similar intensity. If higher depth accuracy is desired, a calibration process may be performed to account for any small differences in illumination caused by approximating ring flashes 830 and 840 as point light sources.

According to some embodiments, the diameter of distal and proximal ring flashes 830 and 840 is the same. Further, the light emitters 845 in proximal ring flash 840 are offset from the light emitters 835 in distal ring flash 830 to minimize shadowing of the light from light emitters 845. For example, when distal and proximal ring flashes 830 and 840 each include eight equally spaced light emitters, the offset is 22.5 degrees. This arrangement is well-suited for fiberscopes, endoscopes, industrial videoscopes and other applications requiring compact arrangements. Consistent with such embodiments, distal and/or proximal ring flashes 830 and/or 840 may be mounted or set within a clear coaxial cylinder 848 around a tube 850, such as a catheter tube, an endoscope, and/or the like. To permit sufficient attenuation of the light from proximal light emitters 845, the coaxial cylinder 848 may be simply a rigid, clear plastic film forming a void in the annular region between the film and tube 850. Preferably, the clear plastic film has an index of refraction as close to one as possible. In an environment where the imaging apparatus is used in air, the index of refraction should be as close to one as possible. Alternatively, the coaxial cylinder 848 could be solid plastic having an index of refraction allowing for sufficient attenuation of light from proximal light emitters 845. Depending on the application, the diameters of and axial distance between ring flashes 830 and 845 and the diameter of tube 850, which is typically opaque, are adjusted or balanced to create a sufficiently compact arrangement and minimize shadowing of light from proximal ring flash by tube 850 and distal ring flash 840 while obtaining optimal depth map detail. In a dark environment, such as with endoscopy, the ring flashes 830 and 840 are used in reverse flash mode as described above.

It is to be understood that the dual ring flash arrangement depicted in FIG. 8 is just one possible configuration of illumination unit 810 and that other arrangements are possible. According to some embodiments, illumination 810 may include at least one point light source and at least one ring flash. For example, the point light source may be positioned closer to the scene than the ring flash and near the line passing through the center of the ring flash and normal to the ring's annular shape. Such an implementation prevents the distal illumination source (i.e., the point illumination source) from blocking light heading to the scene from the proximal ring flash that serves as the distal illumination source.

Figure 9:
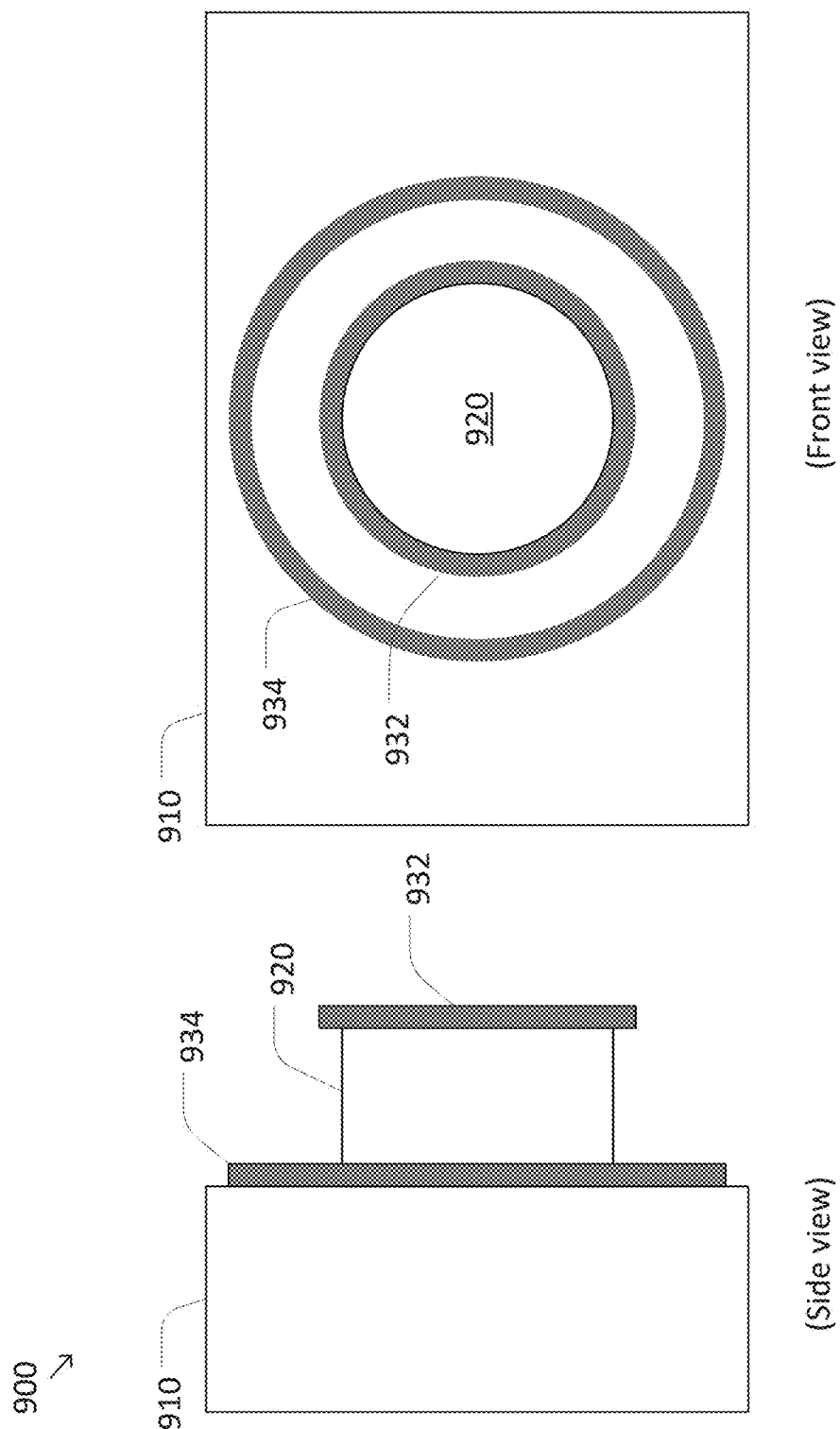
FIG. 9 illustrates a camera adapted to perform depth estimation using ring flashes according to some embodiments.

FIG. 9 illustrates a camera 900 adapted to perform depth estimation using ring flashes according to some embodiments. According to some embodiments, camera 900 may include a standalone camera, a camera integrated into a mobile device and/or a computer monitor, an endoscope, and/or the like. According to some embodiments, camera 900 may include a body 910 and a lens 920. In some examples, camera 900 may include a front ring flash 932 and a back ring flash 934. According to some embodiments consistent with FIGS. 1-8, front ring flash 932 and back ring flash 934 may be used to implement the first light source 112 and second light source 114, respectively, of illumination source 110. As depicted in FIG. 9, front ring flash 932 is mounted to lens 920 and back ring flash 934 is mounted to body 910 to form concentric rings around lens 920. Advantageously, the radius of front ring flash 932 is smaller than the radius of back ring flash 934. Accordingly, front ring flash 932 does not cast a shadow when using back ring flash 934 for a relatively wide range of angles.

Figure 10:
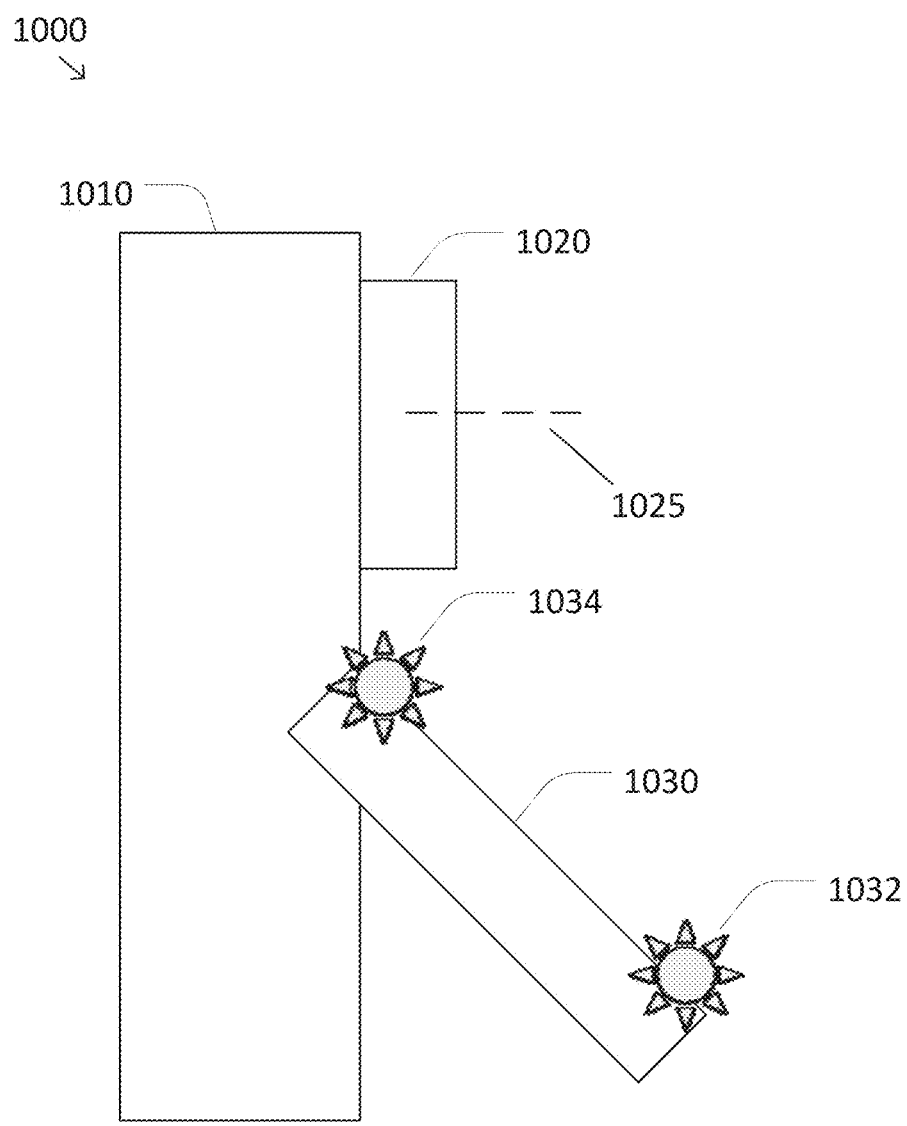
FIG. 10 illustrates a camera adapted to perform depth estimation using a flash rig according to some embodiments.

FIG. 10 illustrates a camera 1000 adapted to perform depth estimation using a flash rig according to some embodiments. Like camera 900, camera 1000 may include a standalone camera, a camera integrated into a mobile device and/or a computer monitor, an endoscope, and/or the like. In some examples, camera 1000 may include a body 1010, a lens 1020, and a flash rig 1030. A first light source 1032 and a second light source 1034 are mounted to the flash rig. According to some embodiments, flash rig 1030 may be oriented at an angle that provides as much separation as possible along optical axis 1025 of lens 1020 without causing first light source 1032 to cast a shadow when using second light source 1034. Although camera 1000 has the advantage of simplicity, this configuration is expected to have reduced accuracy relative to camera 900 because first and second light sources are not positioned along optical axis 1025. For certain applications, reduced accuracy may not be problematic. For example, low accuracy may be sufficient for many gesture recognition applications. Where high accuracy is important, a variety of techniques may be used. For example, flash rig 1030 may be hinged such that it extends directly outward along optical axis 1025 when first light source 1032 is being used and folds inwards along body 1010 to move out of the way when back flash 1034 is being used.

Some examples of controllers, such as processing unit 130 and/or image processor 300 may include non-transient, tangible, machine readable media that include executable code that when run by one or more processors may cause the one or more processors to perform the processes of method 500 and/or 600. Some common forms of machine readable media that may include the processes of method 500 and/or method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A system comprising:
    an illuminator capable of illuminating a scene from at least a first illumination position and a second illumination position;
    an image sensor to capture (i) a first image of the scene while the illuminator illuminates the scene from the first illumination position and (ii) a second image of the scene while the illuminator illuminates the scene from the second illumination position; and
    an image processor to receive the first and second images from the image sensor and estimate a depth of at least one feature that appears in the first and second images, the depth being estimated based on a relative intensity of the first image and the second image, a distance between the first illumination position and the second illumination position, and a position of the at least one feature within at least one of the first and second images, wherein the relative intensity of the first image and the second image is corrected based on an orientation of the at least one feature prior to the depth being estimated.

2. The system of claim 1, wherein the first and second illumination positions form an illumination axis, the image processor has an optical axis, and the illumination axis and the optical axis are generally one of parallel and collinear.

3. The system of claim 1, wherein the illuminator comprises a first light source located at the first illumination position and a second light source located at the second illumination position.

4. The system of claim 3, wherein at least one of the first and second light sources includes a ring flash.

5. The system of claim 3, wherein the first and second light sources are configured as ring flashes mounted to a lens and a body of a camera, respectively, and wherein at least one of the ring flashes is mounted around the lens.

6. The system of claim 3, wherein the first and second light sources are configured as ring illuminators each having approximately the same diameter, and each fixedly mounted relative to a lens of the image sensor.

7. The system of claim 3, wherein the first and second light sources are mounted to a flash rig extending from a camera.

8. The system of claim 3, wherein the first light source is located closer to the scene than the second light source and is smaller than the second light source.

9. The system of claim 3, wherein:
    the first light source is located closer to the scene than the second light source;
    the first and second light sources are configured in a plurality of different positional relationships while illuminating the scene using the second light source, the different positional relationships causing a shadow corresponding to the first light source to be cast in different portions of the scene;
    the image sensor captures a plurality of images corresponding to the plurality of different positional relationships, each of the plurality of images including the shadow corresponding to the first light source; and
    the image processor receives the plurality of images and forms a synthetic image from the plurality of images, the synthetic image corresponding to the second image, wherein the synthetic image does not include the shadow corresponding to the first light source.

10. The system of claim 3, wherein the illuminator operates in a flash mode.

11. The system of claim 3, wherein the illuminator operates in a reverse flash mode.

12. The system of claim 1, wherein the at least one feature includes a point of interest on a surface of an object that appears in the first and second images, and wherein the orientation of the at least one feature includes a surface normal vector of the surface at the point of interest.

13. The system of claim 1, wherein the correction of the relative intensity is larger when the at least one feature is positioned farther from an axis of displacement between the first and second illumination positions than when the at least one feature is positioned closer to the axis of displacement.

14. The system of claim 1, wherein the correction of the relative intensity is larger when the at least one feature is oriented facing away from the illuminator than when the at least one feature is oriented facing towards the illuminator.

15. The system of claim 1, wherein the depth is estimated using a function:

$$d_1 = \frac{\Delta}{\left(\frac{m_1}{m_2}\right) - 1}\left[\cos(\alpha) + \sqrt{\cos^2(\alpha) + \left(\frac{m_1}{m_2}\right) - 1}\right]$$

where:
    $d_1$ is the depth being estimated;
    $\Delta$ is a distance between the first and second illumination positions;

$$\frac{m_1}{m_2}$$

is the relative intensity of the feature in the first and second images; and
    $\alpha$ is an angle between an axis of displacement between the first and second positions and a displacement vector between the first position and the feature.

16. The system of claim 1, wherein the depth is estimated using a function:

$$d_1 = \frac{\Delta}{\rho\left(\frac{m_1}{m_2}\right) - 1}\left[\cos(\alpha) + \sqrt{\cos^2(\alpha) + \left(\frac{m_1}{m_2}\right) - 1}\right]$$

where:
    $d_1$ is the depth being estimated;
    $\Delta$ is a distance between the first and second illumination positions;

$$\frac{m_1}{m_2}$$

is the relative intensity of the feature in the first and second images;

α is an angle between an axis of displacement between the first and second positions and a displacement vector between the first position and the feature; and ρ is a correction factor based on the orientation of the feature.

17. The system of claim 1, wherein the image processor is further configured to generate a depth map by estimating a depth of a plurality of pixels in the first and second images.

18. A method comprising:
obtaining a first intensity measurement of a feature while the feature is illuminated from a first position;
obtaining a second intensity measurement of the feature while the feature is illuminated from a second position;
determining a relative intensity of the feature based on the first and second intensity measurements;
determining a distance between the first and second positions;
determining a location of the feature relative to an axis of displacement between the first and second positions;
correcting the relative intensity based on an orientation of the feature; and
estimating a depth of the feature based on the relative intensity, the distance between the first and second positions, and the location of the feature,
wherein the relative intensity is corrected prior to the depth of the feature being estimated.

19. The method of claim 18, wherein the relative intensity is independent of an albedo of the feature.

20. The method of claim 18, wherein determining the relative intensity of the feature comprises calculating a ratio of the first and second intensity measurements.

21. The method of claim 18, wherein correcting the relative intensity comprises correcting for a difference in angular reflectance between the first and second intensity measurements by assuming the feature has a Lambertian surface.

\* \* \* \* \*